United States Patent
Yee et al.

(10) Patent No.: US 12,505,325 B2
(45) Date of Patent: *Dec. 23, 2025

(54) TRANSACTION CARD WITH MULTIPLE ORIENTATIONS

(71) Applicant: Capital One Services, LLC, McLean, VA (US)

(72) Inventors: Bryant Yee, Silver Spring, MD (US); Tyler Maiman, Melville, NY (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/421,147

(22) Filed: Jan. 24, 2024

(65) Prior Publication Data
US 2024/0160881 A1    May 16, 2024

Related U.S. Application Data

(63) Continuation of application No. 17/934,783, filed on Sep. 23, 2022, now Pat. No. 11,960,951.

(51) Int. Cl.
| | | |
|---|---|---|
| *G06K 19/06* | (2006.01) | |
| *G06K 19/077* | (2006.01) | |
| *G06K 19/08* | (2006.01) | |

(52) U.S. Cl.
CPC . *G06K 19/06187* (2013.01); *G06K 19/07766* (2013.01); *G06K 19/08* (2013.01)

(58) Field of Classification Search
CPC ....... G06K 19/07749; G06K 19/07769; G06K 19/07743; G06K 19/0775;
(Continued)

(56) References Cited

U.S. PATENT DOCUMENTS

| | | |
|---|---|---|
| 5,206,495 A | 4/1993 | Kreft |
| 2003/0111527 A1* | 6/2003 | Blossom ............ G06Q 20/3576 235/380 |

(Continued)

FOREIGN PATENT DOCUMENTS

| | | | | |
|---|---|---|---|---|
| EP | 0163534 B1 * | 9/1992 | ....... | G06K 19/07745 |
| JP | H11115354 A | 4/1999 | | |

(Continued)

OTHER PUBLICATIONS

Hirayama, "Selective and Consecutively Arranging Triple-Notch Code" (Year: 1961).*

(Continued)

*Primary Examiner* — Thien T Mai
(74) *Attorney, Agent, or Firm* — Harrity & Harrity, LLP

(57) ABSTRACT

In some implementations, a transaction card may include a card body having a first surface and a second surface opposite the first surface. The transaction card may include an integrated circuit (IC) chip embedded in the card body, and a plurality of first electrical contact sets electrically accessible from the first surface of the card body, where the plurality of first electrical contact sets have electrical connections to the IC chip. The transaction card may include a plurality of first magnetic stripe areas readable from the first surface of the card body. The transaction card may include a plurality of second electrical contact sets electrically accessible from the second surface of the card body, where the plurality of second electrical contact sets have electrical connections to the IC chip. The transaction card may include a plurality of second magnetic stripe areas readable from the second surface of the card body.

20 Claims, 3 Drawing Sheets

(58) Field of Classification Search
CPC ......... G06K 19/07745; G06K 19/0723; G06K 19/067; G06K 19/07766; G06K 19/08; G06K 19/06187; G06K 19/077; G06K 19/07775; G06K 7/10366; G06K 19/07; G06K 19/0709; G06K 19/0718; G06K 19/07722; G06K 19/07728; G06K 19/07741; G06K 19/07747; G06K 19/07752; G06K 19/07754; G06K 19/07779; G06K 19/07783; G06K 7/10158; G06K 17/00; G06K 19/027; G06K 19/0719; G06K 19/0724; G06K 19/07345; G06K 19/07354; G06K 19/07735; G06K 19/07739; G06K 19/07756; G06K 19/07758; G06K 19/07798; G06K 19/16; G06K 7/00; G06K 7/0008; G06K 7/087; G06K 7/10138; G06K 7/10297; G06K 7/10336; G06K 7/10544; G06K 9/00006
See application file for complete search history.

(56) References Cited

U.S. PATENT DOCUMENTS

| | | |
|---|---|---|
| 2018/0300597 A1 | 10/2018 | Ng et al. |
| 2020/0356832 A1 | 11/2020 | Maiman et al. |
| 2021/0117750 A1 | 4/2021 | Carroll, II et al. |

FOREIGN PATENT DOCUMENTS

| | | | |
|---|---|---|---|
| JP | 4930785 | B2 | 5/2012 |
| JP | 2018180944 | A | 11/2018 |
| KR | 200195389 | Y1 * | 4/2000 |
| WO | 9814916 | A2 | 4/1998 |

OTHER PUBLICATIONS

Learning to Slide a Magnetic Card Through a Card Reader (Year: 2012).*

Co-pending U.S. Appl. No. 17/934,783, inventors Yee; Bryant et al., filed Sep. 23, 2022.

Deutsch A., "Electrical Characteristics of High-Performance Pin-in-Socket and Pad-on-Pad Connectors," IEEE Transactions on Components, Packaging, and Manufacturing Technology: Part B, Feb. 1997, vol. 20 (1), pp. 64-77.

Fancher C.H., "In your Pocket: Smartcards," 1997, pp. 47-53.

* cited by examiner

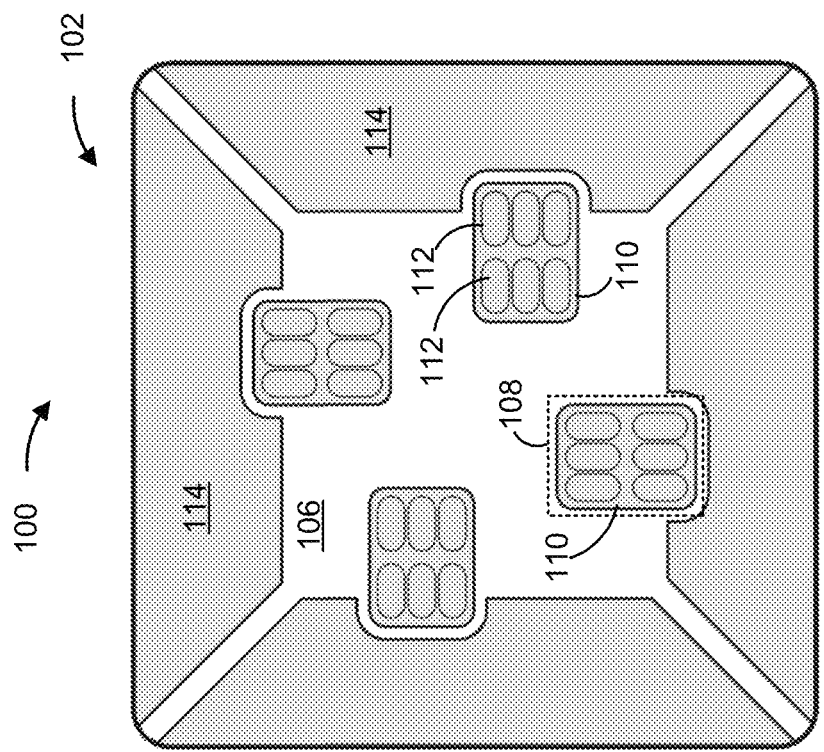
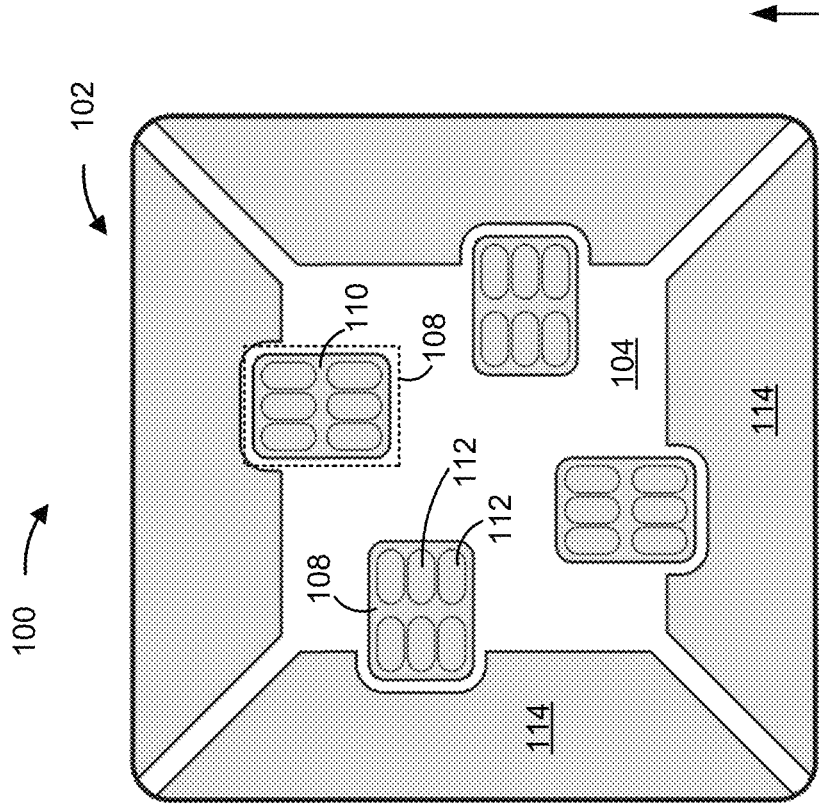
FIG. 1A
FIG. 1B

TRANSACTION CARD WITH MULTIPLE ORIENTATIONS

RELATED APPLICATION

This application is a continuation of U.S. patent application Ser. No. 17/934,783, filed Sep. 23, 2022, which is incorporated herein by reference in its entirety.

BACKGROUND

Transactions often involve use of a transaction card (e.g., a credit card, a debit card, a gift card, an automated teller machine (ATM) card, a rewards card, an access card, or client loyalty card, among other examples) to pay for products or services at a transaction terminal (e.g., point of sale (PoS) terminal) of an individual or business engaged in the sale of goods or services (e.g., via a swiping of the transaction card at a card reader, insertion of the transaction card into a chip reader, or wireless transmission of transaction card data to a wireless receiver). In some instances, a magnetic stripe, integrated circuit chip, radio frequency (RF) antenna, and/or radio frequency identification (RFID) tag may be included in a transaction card to provide information associated with the transaction card (e.g., an account identifier, account information, a payment token, or the like).

SUMMARY

In some implementations, a transaction card includes a card body having a first surface and a second surface opposite the first surface; an integrated circuit (IC) chip embedded in the card body; a plurality of first electrical contact sets electrically accessible from the first surface of the card body, where the plurality of first electrical contact sets have electrical connections to the IC chip; a plurality of first magnetic stripe areas readable from the first surface of the card body; a plurality of second electrical contact sets electrically accessible from the second surface of the card body, where the plurality of second electrical contact sets have electrical connections to the IC chip; and a plurality of second magnetic stripe areas readable from the second surface of the card body.

In some implementations, a transaction card includes a card body having a first surface and a second surface opposite the first surface; at least one IC chip embedded in the card body; a plurality of first electrical contact sets electrically accessible from the first surface of the card body, where the plurality of first electrical contact sets have electrical connections to the at least one IC chip; and a plurality of second electrical contact sets electrically accessible from the second surface of the card body, where the plurality of second electrical contact sets have electrical connections to the at least one IC chip.

In some implementations, a transaction card includes a card body having a first surface and a second surface opposite the first surface; a plurality of first magnetic stripe areas disposed on the first surface of the card body; and a plurality of second magnetic stripe areas disposed on the second surface of the card body.

BRIEF DESCRIPTION OF THE DRAWINGS

FIG. 1A is a front view of an example transaction card, in accordance with some embodiments of the present disclosure.

FIG. 1B is a back view of an example transaction card, in accordance with some embodiments of the present disclosure.

DETAILED DESCRIPTION

Figure 2:
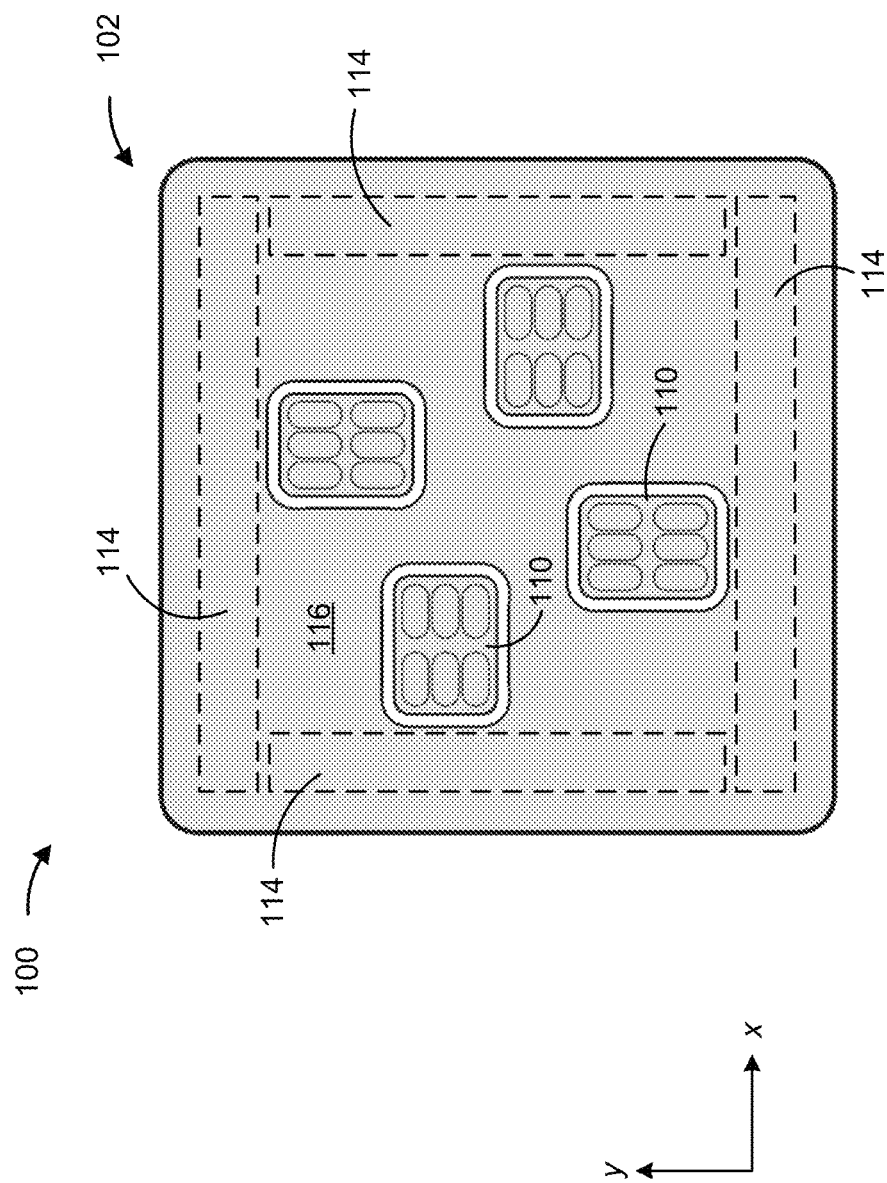
FIG. 2 is a front view of an example transaction card, in accordance with some embodiments of the present disclosure.

The following detailed description of example implementations refers to the accompanying drawings. The same reference numbers in different drawings may identify the same or similar elements.

As described above, a transaction card may include an integrated circuit (IC) chip and/or a magnetic stripe that can be used to provide information associated with the transaction card. For example, a chip reader and/or a magnetic stripe reader may obtain the information when the transaction card is inserted into the chip reader and/or swiped at the magnetic stripe reader. Generally, the transaction card may be configured for insertion into the chip reader and/or for swiping at the magnetic stripe reader in a single orientation. The chip reader and/or the magnetic stripe reader may be unable to obtain the information when the transaction card is inserted into the chip reader and/or swiped at the magnetic stripe reader using an improper orientation of the transaction card. Because there are multiple orientations at which the transaction card can be inserted into the chip reader and/or swiped at the magnetic stripe reader, improper orientations are commonly used. As a result, the chip reader and/or the magnetic stripe reader may expend significant computing resources (e.g., processing resources, memory resources), power resources, and/or network resources attempting to read the information, execute a transaction, and/or transmit transaction details when the transaction card is in an improper orientation. Moreover, an execution time of the transaction may be prolonged when one or more improper orientations of the transaction card are attempted.

Some implementations described herein provide a transaction card that may be used at a chip reader and/or a magnetic stripe reader in multiple orientations. In some implementations, electrical contact sets and/or magnetic stripe areas may be arranged on the transaction card such that the transaction card is readable by a chip reader and/or a magnetic stripe reader in any orientation of the transaction card. For example, the transaction card may include a plurality of electrical contact sets, electrically connected to one or more IC chips, disposed on each of a first surface and a second surface of the transaction card and/or a plurality of magnetic stripe areas disposed on each of the first surface and the second surface. In this way, the transaction card may be used at a chip reader and/or a magnetic stripe reader in any orientation of the transaction card. As a result, computing resources, power resources, and/or network resources, that may otherwise be expended by a chip reader and/or a magnetic stripe reader attempting to process a transaction card in an improper orientation, may be conserved. Moreover, the transaction card may enable faster execution time of transactions, thereby improving an efficiency and a throughput of the chip reader and/or the magnetic stripe reader.

FIG. 1A is a front view of an example transaction card 100, and FIG. 1B is a back view of the example transaction card 100. The transaction card 100 may include a credit card, a debit card, a gift card, an ATM card, a rewards card, an access card, or a client loyalty card, among other examples.

The transaction card 100 may include a card body 102. In some implementations, a length of the card body 102 (e.g., along the x-axis shown) may be equal to a height of the card body 102 (e.g., along the y-axis shown). For example, the card body 102 may be in the overall shape of a square, a cross, or the like. In some implementations, the length of the card body 102 and the height of the card body 102 may each be about (e.g., ±5%) 54 millimeters (mm) (e.g., 53.98 mm) The card body 102 may have a thickness of about 0.75 mm (e.g., 0.76 mm) The card body 102 may include (e.g., may be composed of) a resilient material (e.g., a material that returns to an equilibrium position following deformation). For example, the card body 102 may include a plastic (e.g., polyvinyl chloride (PVC)) and/or a metal (e.g., steel).

The card body 102 may include a thin substrate upon which information or visual indicia are printed. The card body 102 may have a first surface 104 (e.g., a front surface, as shown in FIG. 1A) and a second surface 106 (e.g., a back surface, as shown in FIG. 1B) opposite the first surface 104.

The transaction card 100 may include at least one IC chip 108 (e.g., a EUROPAY®, MASTERCARD®, VISA® (EMV) chip) embedded in the card body 102. The transaction card 100 may include a first IC chip 108 embedded in the card body 102, as shown in FIG. 1A, and a second IC chip 108 embedded in the card body 102, as shown in FIG. 1B. in some implementations, the transaction card 100 may include only the first IC chip 108. The IC chip(s) 108 may store and/or encode information associated with the transaction card 100. For example, the information may identify an account associated with the transaction card 100. When the first IC chip 108 and the second IC chip 108 are employed (as well as any additional IC chips), the first IC chip 108 and the second IC chip 108 may store information relating to the same account (e.g., the first IC chip 108 and the second IC chip 108 may store identical information).

The transaction card 100 may include a plurality of electrical contact sets 110. A plurality of first electrical contact sets 110 may be disposed on the first surface 104 of the card body 102. For example, the first electrical contact sets 110 may be electrically accessible from the first surface 104 of the card body 102. A plurality of second electrical contact sets 110 may be disposed on the second surface 106 of the card body 102. For example, the second electrical contact sets 110 may be electrically accessible from the second surface 106 of the card body 102.

An electrical contact set 110 may include a plurality of electrical contacts 112 arranged into an electrical contact pad (e.g., that has an overall shape that is generally square or rectangular), which can also be referred to as a plate. For example, within an electrical contact set 110, electrical contacts 112 may be separated by a distance of 1 mm or less. Electrical contacts 112 of an electrical contact set 110 may be incorporated into a unitary module, may share a common substrate (e.g., that is attached to the card body 102), or the like. Electrical contacts 112 of an electrical contact set 110 may be for respective terminals (e.g., pins) of an IC chip 108. For example, a first electrical contact 112 of an electrical contact set 110 may be electrically connected (e.g., via wire bonding) to a first terminal of the IC chip 108, a second electrical contact 112 of the electrical contact set 110 may be electrically connected (e.g., via wire bonding) to a second terminal of the IC chip 108, a third electrical contact 112 of the electrical contact set 110 may be electrically connected (e.g., via wire bonding) to a third terminal of the IC chip 108, and so forth.

In some implementations, the first electrical contact sets 110 may include four electrical contact sets 110 and the second electrical contact sets 110 may include four electrical contact sets 110. For example, the first electrical contact sets 110 may include a first electrical contact set 110, a second electrical contact set 110, a third electrical contact set 110, and a fourth electrical contact set 110, and the second electrical contact set 110 may include a fifth electrical contact set 110, a sixth electrical contact set 110, a seventh electrical contact set 110, and an eighth electrical contact set 110.

In some implementations, the first electrical contact sets 110, disposed on the first surface 104 of the card body 102, may have electrical connections to the first IC chip 108. In some implementations, the second electrical contact sets 110, disposed on the second surface 106 of the card body 102, may have electrical connections to the second IC chip 108. Here, a primary electrical contact set 110 of the first electrical contact sets 110 (e.g., the electrical contact set 110 that is directly above the first IC chip 108) may be directly connected to the first IC chip 108 (e.g., electrical contacts 112 of the primary electrical contact set 110 may have wire bonds to terminals of the first IC chip 108), and remaining secondary electrical contact sets 110 of the first electrical contact sets 110 may be indirectly connected to the first IC chip 108 via the primary electrical contact set 110, as described below. Similarly, a primary electrical contact set 110 of the second electrical contact sets 110 (e.g., the electrical contact set 110 that is directly above the second IC chip 108) may be directly connected to the second IC chip 108 (e.g., electrical contacts 112 of the primary electrical contact set 110 may have wire bonds to terminals of the second IC chip 108), and remaining secondary electrical contact sets 110 of the second electrical contact sets 110 may be indirectly connected to the second IC chip 108 via the primary electrical contact set 110, as described below.

In some implementations, the first electrical contact sets 110 and the second electrical contact sets 110 may have electrical connections to the first IC chip 108 (and the transaction card 100 may omit the second IC chip 108). Here, a primary electrical contact set 110 of the first electrical contact sets 110 and the second electrical contact sets 110 may be directly connected to the first IC chip 108, and remaining secondary electrical contact sets 110 of the first electrical contact sets 110 and the second electrical contact sets 110 may be indirectly connected to the first IC chip 108 via the primary electrical contact set 110, as described below.

The first electrical contact sets 110 and the second electrical contact sets 110 may be arranged on the card body 102 such that any orientation in which the transaction card 100 is inserted into a chip reader results in an electrical connection between the chip reader and an electrical contact set 110. For example, the transaction card 100 may be inserted into a chip reader in the orientation shown in FIG. 1A, inserted into the chip reader rotated 90° clockwise from the orientation shown, inserted into the chip reader rotated 180° clockwise from the orientation shown, or inserted into the chip reader rotated 270° clockwise from the orientation shown. In each of these orientations, an electrical contact set 110 will be present at the same relative location (e.g., x, y position) of the transaction card 100. In other words, a configuration of the electrical contact sets 110 (e.g., positions, distances from edges of the card body 102, orientations, or the like, of the electrical contact sets 110) at the first surface 104 of the card body 102 may be identical at a 0° orientation of the transaction card 100, a 90° clockwise orientation of the transaction card 100, a 180° clockwise orientation of the transaction card 100, and a 270° clockwise orientation of the transaction card 100. Moreover, the transaction card 100 may be flipped to the orientation shown in FIG. 1B, and a configuration of the electrical contact sets 110 at the second surface 106 of the card body 102 may be identical at a 0° orientation of the transaction card 100, a 90° clockwise orientation of the transaction card 100, a 180° clockwise orientation of the transaction card 100, and a 270° clockwise orientation of the transaction card 100, in a similar manner as described above. In this way, any orientation of the transaction card 100, that would be accepted by a chip reader, can be used for the chip reader.

The transaction card 100 may include a plurality of magnetic stripe areas 114. A plurality of first magnetic stripe areas 114 may be disposed on the first surface 104 of the card body 102. For example, the first magnetic stripe areas 114 may be readable from the first surface 104 of the card body 102. A plurality of second magnetic stripe areas 114 may be disposed on the second surface 106 of the card body 102. For example, the second magnetic stripe areas 114 may be readable from the second surface 106 of the card body 102. The magnetic stripe areas 114 may be encoded with information associated with the transaction card 100, as described above. For example, every magnetic stripe area 114 of the transaction card 100 may be encoded with information relating to the same account (e.g., the magnetic stripe areas 114 may be encoded with identical information).

In some implementations, the first magnetic stripe areas 114 and/or the second magnetic stripe areas 114 may include discrete magnetic stripes (also referred to as "magnetic strips"), as shown. That is, a magnetic stripe area 114 may be a magnetic stripe that is separate from (e.g., separated by areas of the card body 102 from) any other magnetic stripe of the transaction card 100. A magnetic stripe may have a trapezoidal shape, as shown, or a rectangular shape, among other examples. In some implementations, each magnetic stripe may extend to a respective edge of the card body 102, as shown. In some implementations, a magnetic stripe may include a notch that receives a portion of an electrical contact set 110. For example, each magnetic stripe may include a notch to receive a portion of a respective electrical contact set 110, as shown. A magnetic stripe may include a magnetic material having magnetic particles, and a magnetism of the magnetic particles can be modified to encode particular data (e.g., by passing the magnetic stripe through a magnetic encoding device). In some implementations, the first magnetic stripe areas 114 and/or the second magnetic stripe areas 114 may include discrete areas of a magnetic material layer disposed on the card body 102, as described in connection with FIG. 2.

In some implementations, visual indicia may be on (e.g., printed on) one or more magnetic stripe areas 114. For example, the visual indicia may include textual content and/or graphical content, such as account information associated with the transaction card 100 and/or a logo of the transaction card 100, among other examples. In some implementations, the transaction card 100 may include a cover layer (e.g., a laminate material) on the first magnetic stripe areas 114 and/or the second magnetic stripe areas 114. For example, the transaction card 100 may include a first cover layer on the first magnetic stripe areas 114 that conceals the first magnetic stripe areas 114 (e.g., so that the first magnetic stripe areas 114 are not visible to a user) and/or a second cover layer on the second magnetic stripe areas 114 that conceals the second magnetic stripe areas 114. A cover layer may include openings corresponding to locations of electrical contact sets 110 to expose the electrical contact sets 110 (e.g., so that the electrical contact sets 110 are electrically accessible).

In some implementations, the first magnetic stripe areas 114 may include four magnetic stripe areas 114 and the second magnetic stripe areas 114 may include four magnetic stripe areas 114. For example, the first magnetic stripe areas 114 may include a first magnetic stripe area 114, a second magnetic stripe area 114, a third magnetic stripe area 114, and a fourth magnetic stripe area 114, and the second magnetic stripe areas 114 may include a fifth magnetic stripe area 114, a sixth magnetic stripe area 114, a seventh magnetic stripe area 114, and an eighth magnetic stripe area 114.

The first magnetic stripe areas 114 and the second magnetic stripe areas 114 may be arranged on the card body 102 such that any orientation in which the transaction card 100 is swiped at a magnetic stripe reader results in a magnetic stripe area 114 being readable by the magnetic stripe reader. For example, the transaction card 100 may be swiped at a magnetic stripe reader in the orientation shown in FIG. 1A, swiped at the magnetic stripe reader rotated 90° clockwise from the orientation shown, swiped at the magnetic stripe reader rotated 180° clockwise from the orientation shown, or swiped at the magnetic stripe reader rotated 270° clockwise from the orientation shown. In each of these orientations, a magnetic stripe area 114 will be present at the same relative location (e.g., x, y position) of the transaction card 100. In other words, a configuration of the magnetic stripe areas 114 (e.g., positions, distances from edges of the card body 102, orientations, or the like, of the magnetic stripe areas 114) at the first surface 104 of the card body 102 may be identical at a 0° orientation of the transaction card 100, a 90° clockwise orientation of the transaction card 100, a 180° clockwise orientation of the transaction card 100, and a 270° clockwise orientation of the transaction card 100. Moreover, the transaction card 100 may be flipped to the orientation shown in FIG. 1B, and a configuration of the magnetic stripe areas 114 at the second surface 106 of the card body 102 may be identical at a 0° orientation of the transaction card 100, a 90° clockwise orientation of the transaction card 100, a 180° clockwise orientation of the transaction card 100, and a 270° clockwise orientation of the transaction card 100, in a similar manner as described above. In this way, any orientation of the transaction card 100, that would be accepted by a magnetic stripe reader, can be used for the magnetic stripe reader.

As indicated above, FIG. 1 is provided as an example. Other examples may differ from what is described with regard to FIG. 1.

FIG. 2 is a front view of the example transaction card 100. Additionally, or alternatively, FIG. 2 may correspond to a back view of the example transaction card 100. FIG. 2 shows an alternative implementation of the magnetic stripe areas 114 from that shown in FIGS. 1A-1B. In some implementations, one surface of the transaction card 100 (e.g., one of the first surface 104 or the second surface 106) may include magnetic stripe areas 114 as described in connection with FIGS. 1A-1B, and the other surface of the transaction card 100 (e.g., the other of the first surface 104 or the second surface 106) may include magnetic stripe areas 114 as described in connection with FIG. 2.

As described above, the first magnetic stripe areas 114 and/or the second magnetic stripe areas 114 may include discrete areas of a magnetic material layer 116 disposed on the card body 102. For example, a magnetic stripe area 114 may be an encoded area (or an area designated for encoding) of the magnetic material layer 116, where other areas of the magnetic material layer 116 are not encoded (or are not designated for encoding). In some implementations, the transaction card 100 may include a first magnetic material layer 116 disposed on the first surface 104 of the card body 102 (e.g., to cover an entirety of the first surface 104), and the first magnetic stripe areas 114 may be defined in the first magnetic material layer 116. Additionally, or alternatively, the transaction card 100 may include a second magnetic material layer 116 disposed on the second surface 106 of the card body 102 (e.g., to cover an entirety of the second surface 106), and the second magnetic stripe areas 114 may be defined in the second magnetic material layer 116. A magnetic material layer 116 may include openings corresponding to locations of electrical contact sets 110 to expose the electrical contact sets 110 (e.g., so that the electrical contact sets 110 are electrically accessible).

As indicated above, FIG. 2 is provided as an example. Other examples may differ from what is described with regard to FIG. 2.

Figure 3:
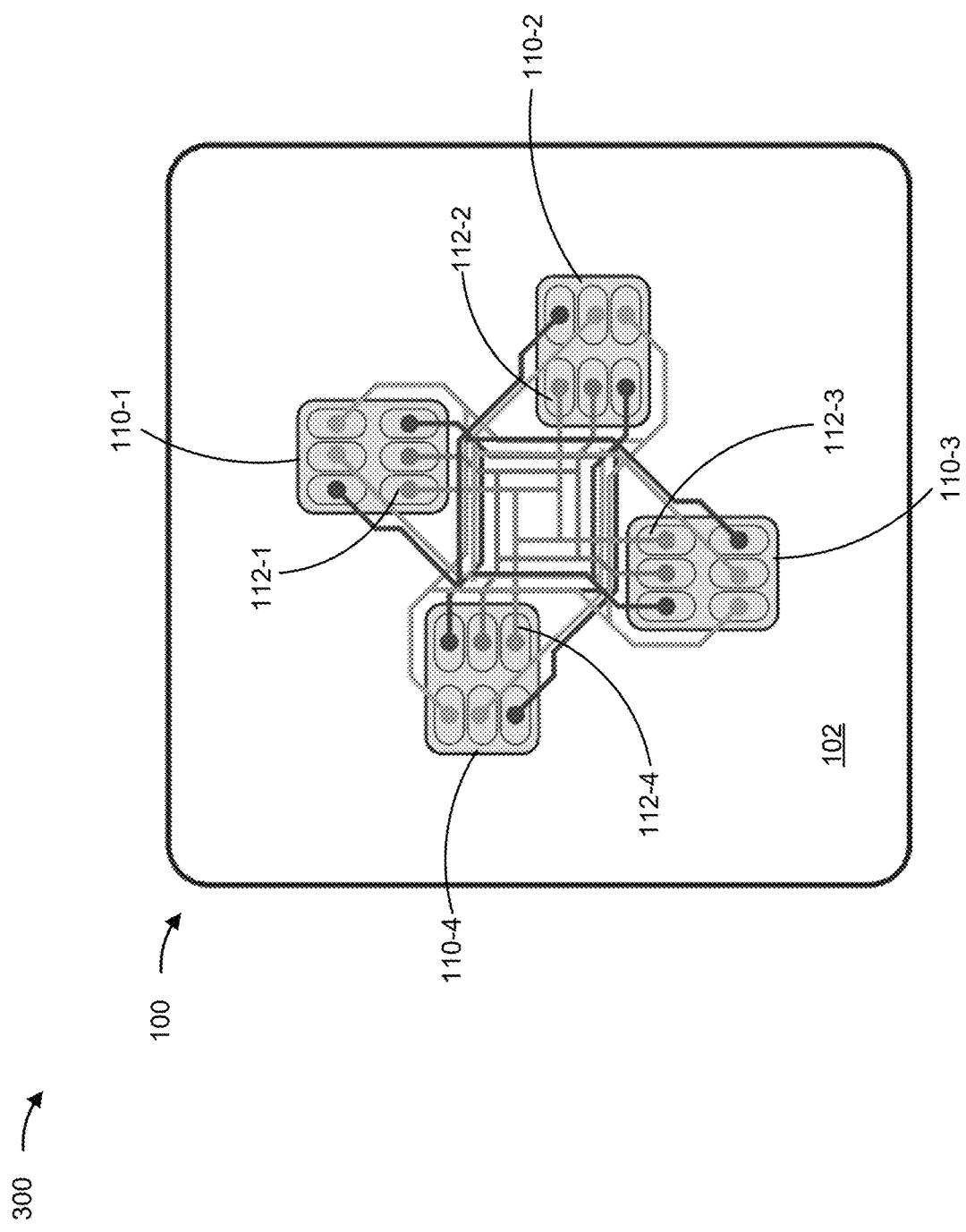
FIG. 3 shows an example of circuitry for a transaction card, in accordance with some embodiments of the present disclosure.

FIG. 3 shows an example 300 of circuitry for the transaction card 100. As described above, the transaction card 100 includes a plurality of electrical contact sets 110, shown in FIG. 3 as electrical contact sets 110-1, 110-2, 110-3, and 110-4. In the example 300, the electrical contact set 110-1 may be directly connected to an IC chip 108 (e.g., the electrical contact set 110-1 may be a primary electrical contact set), as described above. For example, electrical contacts 112 of the electrical contact set 110-1 may be directly connected (e.g., by wire bonds) to corresponding terminals of the IC chip 108. Each electrical contact set 110 may include a respective electrical contact, shown as electrical contacts 112-1, 112-2, 112-3, and 112-4, for a particular terminal of the IC chip 108. In other words, the electrical contacts 112-1, 112-2, 112-3, and 112-4 may each have an electrical connection to the particular terminal of the IC chip 108. The electrical contacts 112-1, 112-2, 112-3, and 112-4 may also be electrically connected to each other. Thus, the electrical contact 112-1 may have a direct connection to the terminal of the IC chip 108, and the electrical contacts 112-2, 112-3, and 112-4 may have indirect connections to the terminal of the IC chip 108 via the electrical contact 112-1. The electrical contacts 112-1, 112-2, 112-3, and 112-4 may have a same location with respect to the corresponding electrical contact sets 110-1, 110-2, 110-3, and 110-4.

In some implementations, the electrical contacts 112-1, 112-2, 112-3, and 112-4 may be electrically connected in parallel, as shown, so that the transaction card 100 may be readable by a chip reader even if one or more electrical contacts 112, or associated wiring, were to fail. In some implementations, the electrical contacts 112-1, 112-2, 112-3, and 112-4 may be electrically connected in series to simplify the circuitry. In some implementations, the electrical contacts 112-2, 112-3, and 112-4 may each have a respective electrical connection to the electrical contact 112-1 (e.g., which is directly connected to the terminal of the IC chip 108), but the electrical contacts 112-2, 112-3, and 112-4 may be electrically isolated from each other. In some implementations, the electrical contacts 112-1, 112-2, 112-3, and 112-4 may be electrically isolated from each other, and each of the electrical contacts 112-1, 112-2, 112-3, and 112-4 may have a direct electrical connection to the terminal of the IC chip 108. Additional respective electrical contacts of each electrical contact set 110, for another terminal of the IC chip 108, and so forth may be configured in a similar manner as described above.

Electrical connections described herein may be wire bonds, traces, leads, or a combination thereof. Electrical connections described herein may be embedded in the card body 102. Additionally, or alternatively, electrical connections described herein may be disposed on the card body 102, and one or more cover layers may be disposed on the electrical connections.

As indicated above, FIG. 3 is provided as an example. Other examples may differ from what is described with regard to FIG. 3.

The foregoing disclosure provides illustration and description, but is not intended to be exhaustive or to limit the implementations to the precise forms disclosed. Modifications may be made in light of the above disclosure or may be acquired from practice of the implementations.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A card, comprising:
    an integrated circuit (IC) chip;
    an electrical contact set electrically connected to the IC chip; and
    a magnetic stripe area comprising a notch that receives a first portion of an electrical contact of the electrical contact set, wherein a second portion of the electrical contact extends beyond the magnetic stripe area and resides on a surface of the card.

2. The card of claim 1,
    wherein the electrical contact set comprises a plurality of electrical contacts including the electrical contact.

3. The card of claim 2,
wherein the plurality of electrical contacts shares a common substrate that is different from a card body of the card, wherein the IC chip is integrated into the card body.

4. The card of claim 2,
wherein the plurality of electrical contacts are incorporated into a unitary module.

5. The card of claim 2,
wherein the plurality of electrical contacts are each electrically connected to a different terminal of the IC chip.

6. The card of claim 1, further comprising:
a second IC chip;
a second electrical contact set electrically connected to the second IC chip; and
a second magnetic stripe area comprising a notch that receives a portion of an electrical contact of the second electrical contact set.

7. The card of claim 6,
wherein a second portion of the second electrical contact set extends beyond the second magnetic stripe area.

8. A card, comprising:
an integrated circuit (IC) chip;
a plurality of electrical contact sets electrically connected to the IC chip; and
a plurality of magnetic stripe areas comprising:
    a first magnetic stripe area comprising a notch that receives a portion of a first electrical contact of the plurality of electrical contact sets, and
    a second magnetic stripe area comprising a notch that receives a portion of a second electrical contact of the plurality of electrical contact sets, wherein at least one of:
        a second portion, of the first electrical contact, extends beyond the first magnetic stripe area and resides on a surface of the card, or
        a second portion, of the second electrical contact, extends beyond the second magnetic stripe area and resides on the surface of the card.

9. The card of claim 8, wherein:
the first electrical contact set comprises a first plurality of electrical contacts comprising the first electrical contact, and
the second electrical contact set comprises a second plurality of electrical contacts comprising the second electrical contact.

10. The card of claim 9, wherein:
the first plurality of electrical contacts shares a first common substrate, and
the second plurality of electrical contacts shares a second common substrate different from the first common substrate.

11. The card of claim 9, wherein:
the first plurality of electrical contacts are incorporated into a first unitary module, and
the second plurality of electrical contacts are incorporated into a second unitary module different from the first unitary module.

12. The card of claim 9, wherein:
the first plurality of electrical contacts are each electrically connected to a different terminal of the IC chip, and
the second plurality of electrical contacts are each electrically connected to the different terminal of the IC chip.

13. The card of claim 8, further comprising:
a second IC chip;
a second plurality of electrical contact sets electrically connected to the second IC chip; and
a second plurality of magnetic stripe areas comprising:
    a first magnetic stripe area comprising a notch that receives a portion of a first electrical contact of the second plurality of electrical contact sets, and
    a second magnetic stripe area comprising a notch that receives a portion of a second electrical contact of the second plurality of electrical contact sets.

14. A card, comprising:
a plurality of integrated circuit (IC) chips comprising a first IC chip and a second IC chip;
a plurality of electrical contact sets comprising:
    a first electrical contact set electrically connected to the first IC chip, and
    a second electrical contact set electrically connected to the second IC chip; and
a plurality of magnetic stripe areas comprising:
    a first magnetic stripe area comprising a notch that receives a portion of a first electrical contact of the first electrical contact set, and
    a second magnetic stripe area comprising a notch that receives a portion of a second electrical contact of the second electrical contact set, wherein at least one of:
        a second portion, of the first electrical contact, extends beyond the first magnetic stripe area and resides on a first surface of the card, or
        a second portion, of the second electrical contact, extends beyond the second magnetic stripe area and resides on a second surface of the card that is different from the first surface of the card.

15. The card of claim 14, wherein:
the first electrical contact set comprises a first plurality of electrical contacts comprising the first electrical contact, and
the second electrical contact set comprises a second plurality of electrical contacts comprising the second electrical contact.

16. The card of claim 15, wherein:
the first plurality of electrical contacts shares a first common substrate, and
the second plurality of electrical contacts shares a second common substrate different from the first common substrate.

17. The card of claim 15, wherein:
the first plurality of electrical contacts are incorporated into a first unitary module, and
the second plurality of electrical contacts are incorporated into a second unitary module different from the first unitary module.

18. The card of claim 15, wherein:
the first plurality of electrical contacts are each electrically connected to a different terminal of the first IC chip, and
the second plurality of electrical contacts are each electrically connected to a different terminal of the second IC chip.

19. The card of claim 14, wherein:
the first surface is a front of the card, and
the second surface is a back of the card.

20. The card of claim 14, wherein:
the first electrical contact set and the first magnetic stripe area are in a first orientation, and
the second electrical contact set and the second magnetic stripe area are in a second orientation different from the first orientation.

\* \* \* \* \*